United States Patent
Hornberger et al.

(10) Patent No.: US 6,904,389 B2
(45) Date of Patent: Jun. 7, 2005

(54) REMOTE COMPUTER TESTING (75) Inventors: Mary J Hornberger, Corvallis, OR (US); Gregory J May, Corvallis, OR (US)

(73) Assignee: Hewlett-Packard Development Company, L.P., Houston, TX (US)

( * ) Notice: Subject to any disclaimer, the term of this patent is extended or adjusted under 35 U.S.C. 154(b) by 385 days.

(21) Appl. No.: 09/800,531

(22) Filed: Mar. 6, 2001

(65) Prior Publication Data

US 2002/0128793 A1 Sep. 12, 2002

(51) Int. Cl.⁷ .................................................. G06F 11/00
(52) U.S. Cl. ........................................ 702/188; 714/46
(58) Field of Search ................................. 702/183, 185, 702/188; 714/34, 46; 713/340

(56) References Cited

U.S. PATENT DOCUMENTS

| | | | | |
|---|---|---|---|---|
| 5,157,782 A | * | 10/1992 | Tuttle et al. ................... | 714/45 |
| 5,353,240 A | * | 10/1994 | Mallory et al. ............. | 702/186 |
| 5,367,667 A | | 11/1994 | Matson et al. | |
| 5,379,409 A | * | 1/1995 | Ishikawa ...................... | 714/45 |
| 5,438,528 A | | 8/1995 | Russell et al. | |
| 5,455,933 A | | 10/1995 | Schieve et al. | |
| 5,491,791 A | | 2/1996 | Kistenmacher et al. | |
| 5,602,750 A | * | 2/1997 | Severt et al. ................ | 364/481 |
| 5,630,049 A | * | 5/1997 | Cardoza et al. ......... | 395/183.01 |
| 5,640,537 A | * | 6/1997 | Jessen et al. .................. | 703/23 |
| 5,669,000 A | * | 9/1997 | Jessen et al. ................ | 395/704 |
| 5,930,501 A | * | 7/1999 | Neil ............................ | 395/551 |
| 5,953,684 A | | 9/1999 | Alexander | |
| 6,023,507 A | | 2/2000 | Wookey | |
| 6,029,257 A | * | 2/2000 | Palmer ......................... | 714/40 |
| 6,053,052 A | * | 4/2000 | Starostovic ................... | 73/851 |
| 6,094,720 A | * | 7/2000 | Cromer et al. .................. | 713/1 |
| 6,098,182 A | | 8/2000 | Cowan | |
| 6,115,645 A | * | 9/2000 | Berar ......................... | 700/121 |
| 6,138,249 A | | 10/2000 | Nolet | |
| 6,212,286 B1 | * | 4/2001 | Rott et al. ................... | 382/100 |
| 6,360,268 B1 | * | 3/2002 | Silva et al. ................. | 709/227 |

FOREIGN PATENT DOCUMENTS

| | | |
|---|---|---|
| EP | 0550135 | 7/1993 |
| EP | 0919823 | 6/1999 |
| EP | 0921465 | 6/1999 |
| GB | 2347242 | 8/2000 |
| WO | WO 9406078 | 3/1994 |
| WO | WO 0048075 | 8/2000 |
| WO | WO 0109724 | 2/2001 |

* cited by examiner

*Primary Examiner*—Marc S. Hoff
*Assistant Examiner*—Paul L Kim (57) ABSTRACT

A product under test is tested remotely. A network accessible site receives input for the product under test from a remote user connected to a network accessible site. The input for the product under test is forwarded to a process that presents the input to the product under test as if the input came from an input device directly connected to the product under test. Display information from the product under test is intercepted. The display information describes a current display generated by the product under test. The intercepted display information is displayed on the network accessible site.

18 Claims, 7 Drawing Sheets

REMOTE COMPUTER TESTING

BACKGROUND

The present invention concerns testing of computers and pertains particularly to remote testing of computers.

Often when a customer makes a purchase of a large number of units of a device, a certain amount of hardware and or software customization is requested. Whenever hardware components or software components are added or changed, significant testing is generally performed. Computers, for example, are tested by the manufacturer, and then sometimes retested by the customer.

Customers that have custom software applications often want or require the ability to retest the custom software on computers whenever the manufacturer changes any of the components of the computer. This can add significant delay to the process the manufacturer uses to release the computer with changed components. Additionally, in order to comply with the customer's testing requirement, the manufacture needs to arrange for samples of changed parts to be shipped to customers for testing after the manufacturer has completed its own testing.

When customers retest custom software applications on computers, this can also increase the cost to the manufacturer, for example to cover shipping and provision of samples. There is also the increased cost for additional logistical coordination that needs to be provided by the manufacturer. If a customer does not approve reception of a changed component until the customer completes testing, this can add four or more weeks of delay for the manufacturer in implementing a change after the manufacturer finishes its own testing. If the component change is the result of a quality issue or a technology obsolescence, the manufacturer may not have the option of interim shipping of computers using the previous component. This can have a significant financial impact on the manufacturer.

SUMMARY OF THE INVENTION

In accordance with the preferred embodiment of the present invention, a product under test (PUT) is tested remotely. A network accessible site receives input for the product under test from a remote user connected to an network accessible site. The input for the product under test is forwarded to a process that presents the input to the product under test as if the input came from an input device directly connected to the product under test. Display information from the product under test is intercepted. The display information describes a current display generated by the product under test. The intercepted display information is displayed on the network accessible site.

For example, the input device is a keyboard, a pointing device (such as a mouse or trackball) and/or some other input device. The display information is intercepted, for example, via a monitor port. The input is presented to the product under test, for example, via an input/output port such as a universal serial bus (USB) port.

In a preferred embodiment of the present invention, the network accessible site obtains from the remote user a test device configuration. The test device configuration is used to configure or select the product under test. For example, the test device configuration includes a specification of memory size, a specification of external devices connected to the product under test and/or a model number of the product under test.

The present invention allows a customer or other remote user to start testing a product under test while the product under test still resides at a manufacturing site. This eliminates multiple shipments of hardware to a customer if revisions keep rolling, and keeps the customer responsible for testing of their own custom software. This also allows the manufacturer to allow other entities to access and test the hardware remotely.

DESCRIPTION OF THE PREFERRED EMBODIMENTS

Figure 1:
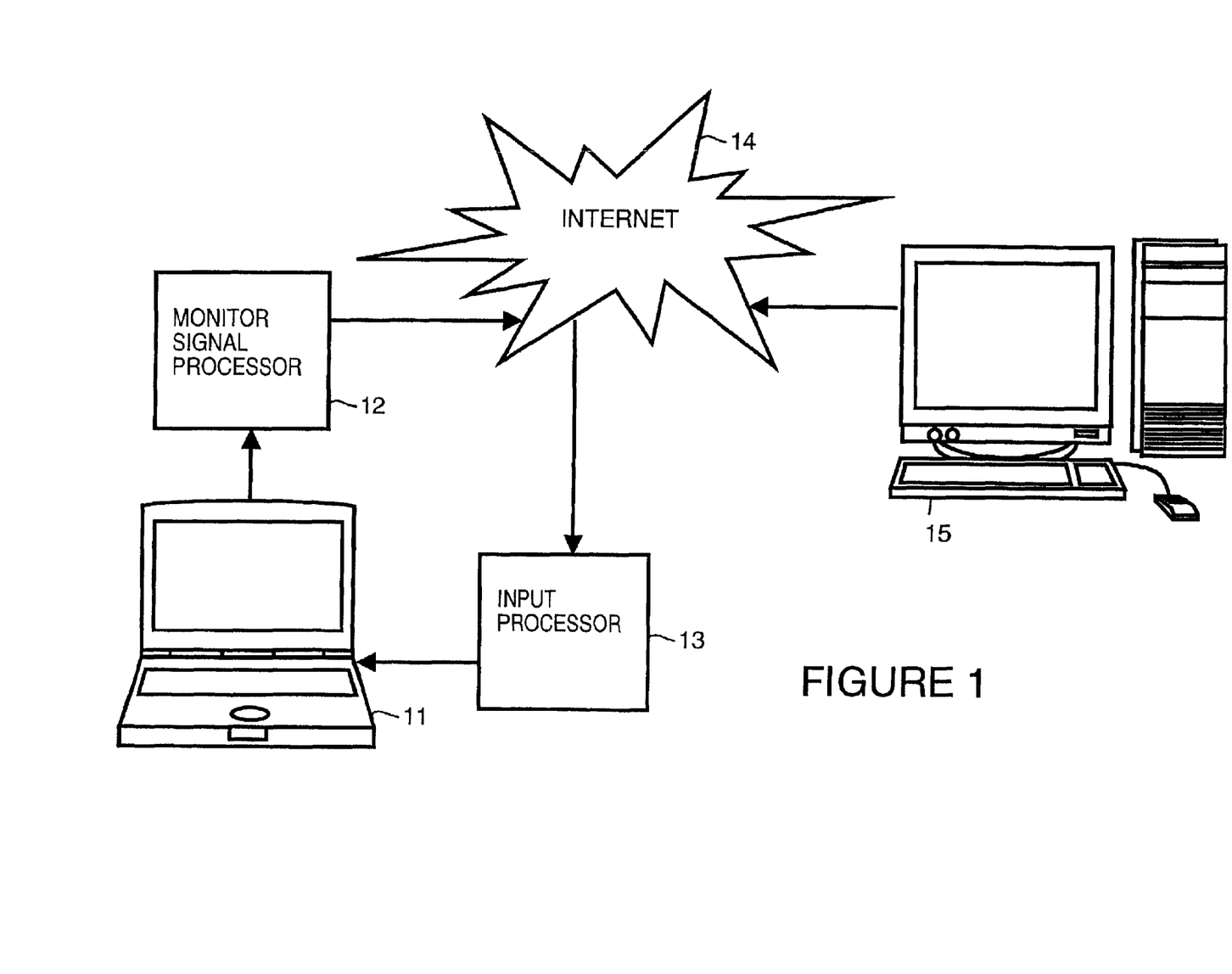
FIG. 1 is a simplified block diagram that illustrates remote testing of computing systems in accordance with a preferred embodiment of the present invention.

FIG. 1 is a simplified block diagram that illustrates remote testing of a product under test (PUT) 11 in accordance with a preferred embodiment of the present invention. In FIG. 1, product under test 11 is shown to be a notebook computer, however, product under test 11 can be any product under test with computer processing capability.

Product under test 11 is located at a site controlled by the manufacturer. However, input and output from product under test 11 is directed to a web site accessible using a network 14. For example network 14 is the internet, a local network (LAN), or a connection through a phone line. A virtual or "customer located" product under test 15, located at a remote site, can be used to remotely provide input that is downloaded into product under test 11 as entered directly into virtual or "customer located" product under test 15 via a keyboard, mouse or other input device.

A processing system 13 receives input from virtual or "customer located" product under test 15 through network 14 and then presents it to product under test 11 as if the input originated on the keyboard or other input device directly connected to product under test 11. For example, processing system 13 is connected to product under test 11 via a universal serial bus (USB) port. Alternatively, processing system 13 is connected to product under test 11 via any other means such as an I/O bus or mechanical means that allows for input of data into product under test 11.

A monitor signal processor 12 receives video signals from product under test 11 and forwards the resulting display to a web site on network 14. For example, monitor video signal processor 12 is connected to a video output of product under test 11.

Customer software to be tested on product under test 11 is downloaded over network 14 to the product under test 11. Alternatively, media containing the customer software can be physically delivered to the manufacturer and manually installed on product under test 11.

Figure 2:
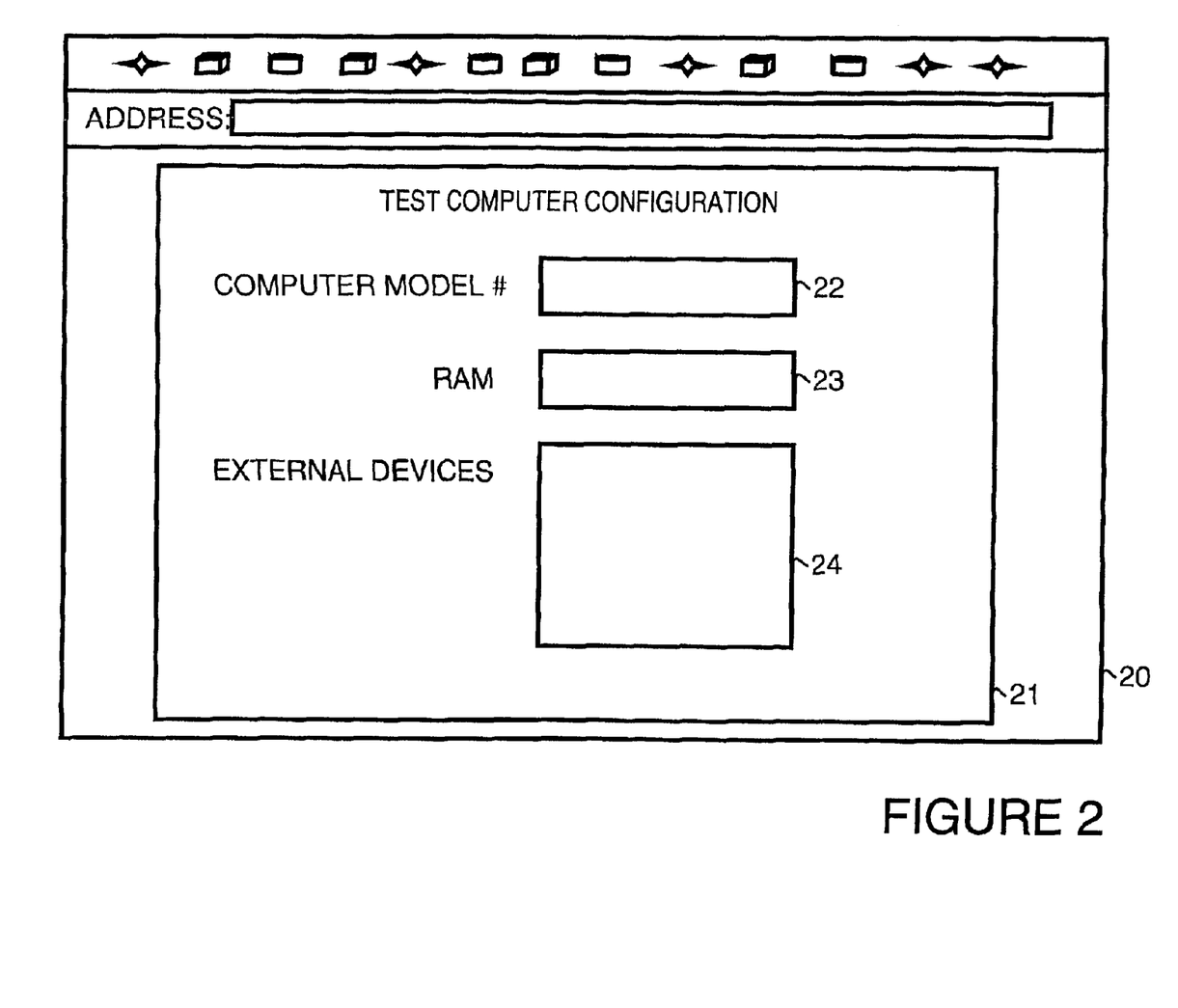
FIG. 2 is a simplified display of a World Wide Web (WWW) page used to set up remote testing of computing systems in accordance with a preferred embodiment of the present invention.

FIG. 2 is a simplified display of a world wide web (WWW) page 20 used to set up remote testing of product under test 11. A customer or other remote user of product under test 11 specifies the configuration of product under test 11. For example, a configuration window 21 allows selection of a computer model number in a box 22, the amount of random access memory (RAM) in a box 23 and connected external devices in a box 24.

Once a remote user chooses a configuration, the web site is connected to a product under test with the required configuration. This is done, for example, by automatically selecting a product under test at the manufacturer's site that has been preconfigured with the configuration selected by the customer. In order to allow this to happen automatically, it is necessary to have at least one product under test available for every configuration selectable by a remote user. When it is impractical or too expensive for a manufacturer to have at least once product under test available for every configuration selectable by a remote user, the manufacturer can make available a lesser number of product under tests (e.g. one product under test) that can be manually configured in response to the configuration requested by a remote user.

Figure 3:
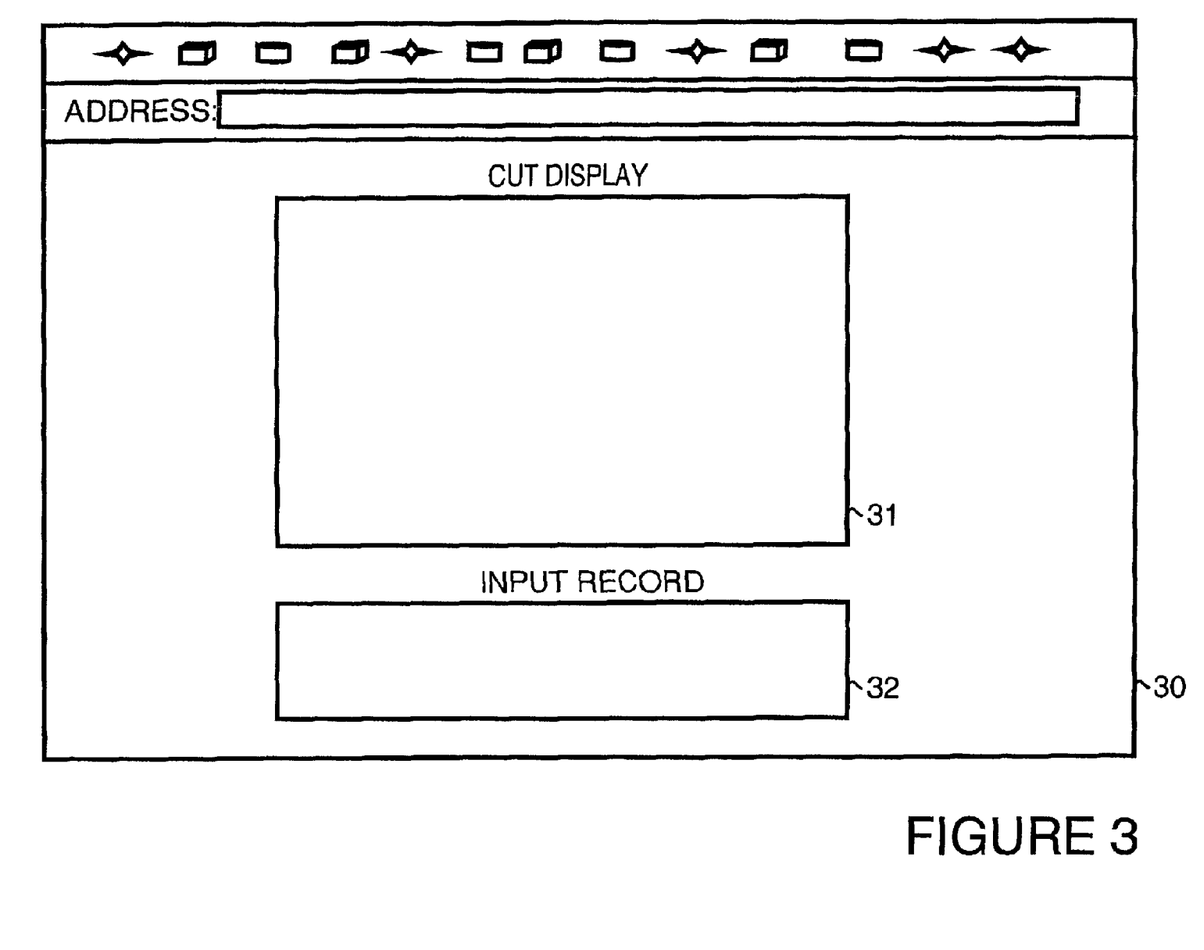
FIG. 3 is a simplified display of a WWW page used to perform remote testing of computing systems in accordance with a preferred embodiment of the present invention.

FIG. 3 is a simplified display of a World Wide Web Page 30 used to perform remote testing of product under test 11. A product under test (PUT) display window 31 shows a real time version of the display signal of product under test 11 (shown in FIG. 1) as intercepted by monitor signal processor 12 and forwarded to network 14. When display window 31 is active, keyboard strokes, mouse clicks and/or input received from other input devices are received by processing system 13 (shown in FIG. 1) and input to product under test 11 as if made from a keyboard, mouse or other input device directly connected to product under test 11. Alternatively, a batch file can be used to supply input. The remote user can immediate see the resulting changes in the display as shown in PUT display 31. Keystrokes and/or other input information can also be displayed in an optional input record box 32. A product under test (PUT) schedule 33 indicates times the product under test is available to be used for testing purposes. A remote user can use the schedule both to determine when the product under test is available as well as to reserve times for testing.

Figure 4:
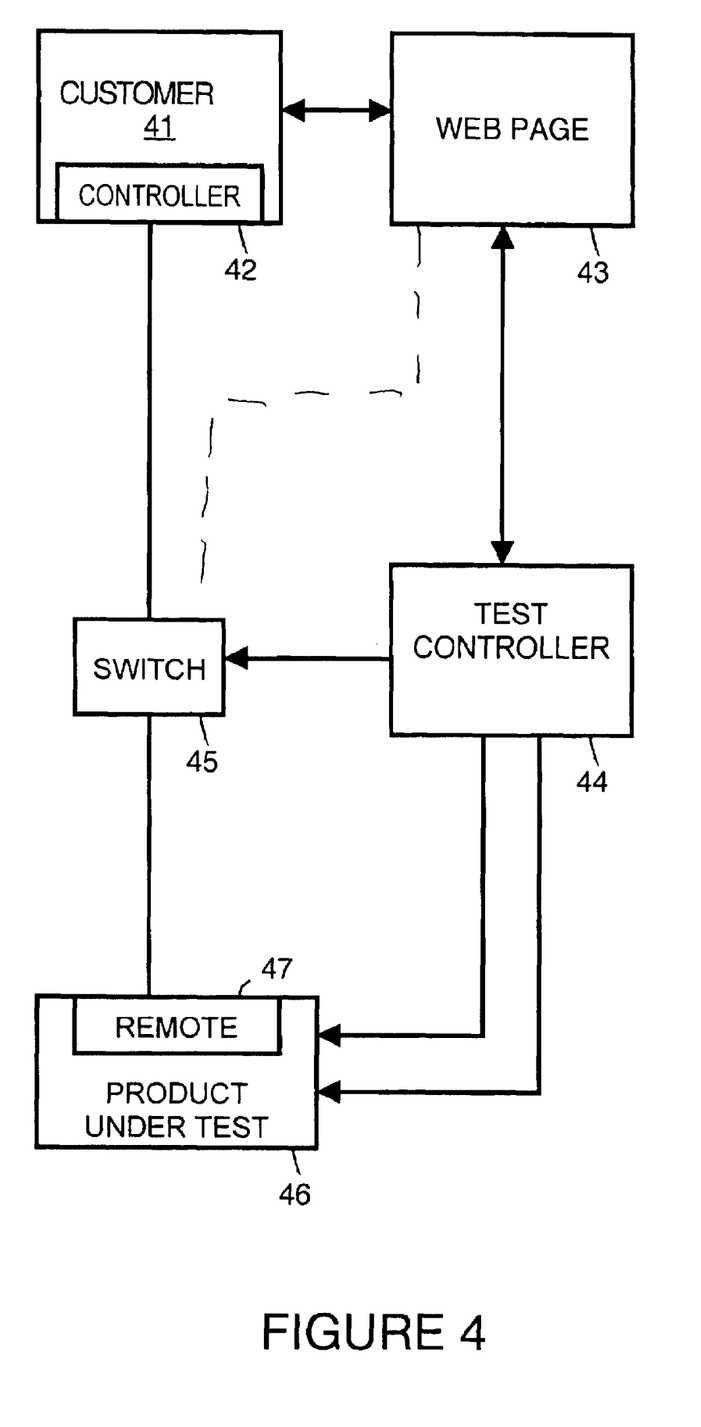
FIG. 4 is a simplified block diagram that shows data flow between a customer and a product under test in accordance with a preferred embodiment of the present invention.

FIG. 4 is a simplified block diagram that shows data flow between a customer 41 and a product under test 46. A web page 43 is used by customer 41 to obtain an internet address by which a controller 42 within customer 41 can contact a remote controller 47 within product under test 46. Web page 43 also allows customer 41 to communicate with a test controller 44. Test controller 44 provides any unique signals not covered in software control, such as power on and reset, to product under test 46. Power-on and reset are referred to herein as hardware commands because they have to do with supplying power to hardware, and/or performing a hardware reset. Additionally a switch 45 can optionally be included. Switch 45 allows test controller 44 to have additional control over testing by the manufacturer. For example, switch 45 allows a manufacturer to disconnect a customer 41 from product under test 46 when an agreed upon time limit has expired. This allows the manufacturer to shut down tests and to set up for another customer. Switch 45 can also allow test controller 44 to provide special commands to remote controller 47, such as "hard reset" and "power on/off" that may not be available in a product implementing the interface between controller 42 and remote controller 47. Alternatively, controller 44 can provide the special commands directly to product under test 46.

When product under test 46 is a personal computer running the Windows Operating System, available from Microsoft Corporation, the interface between controller 42 and remote controller 47 within product under test 46 can be implemented, for example, using Carbon Copy for Windows, available from Compaq Computer Corporation, having a business address of 20555 SH 249, Houston, Tex. 77070-2698.

Instead of being connected through the internet, customer 41 can be connected to switch 45 and through web page 43 to test controller 44 by some other network media, for example, by direct connection through a phone line.

Also while FIG. 4 shows customer 41 being connected to switch 45 through a data path implemented by controller 42, alternatively, customer 41 can be connected to switch 45 through a datapath between web page 43 and switch 45. The datapath between web page 43 and switch 45 is illustrated by the dashed line shown in FIG. 4. The data paths shown in FIG. 4 can be implemented, for example, using a single network connection.

Figure 5:
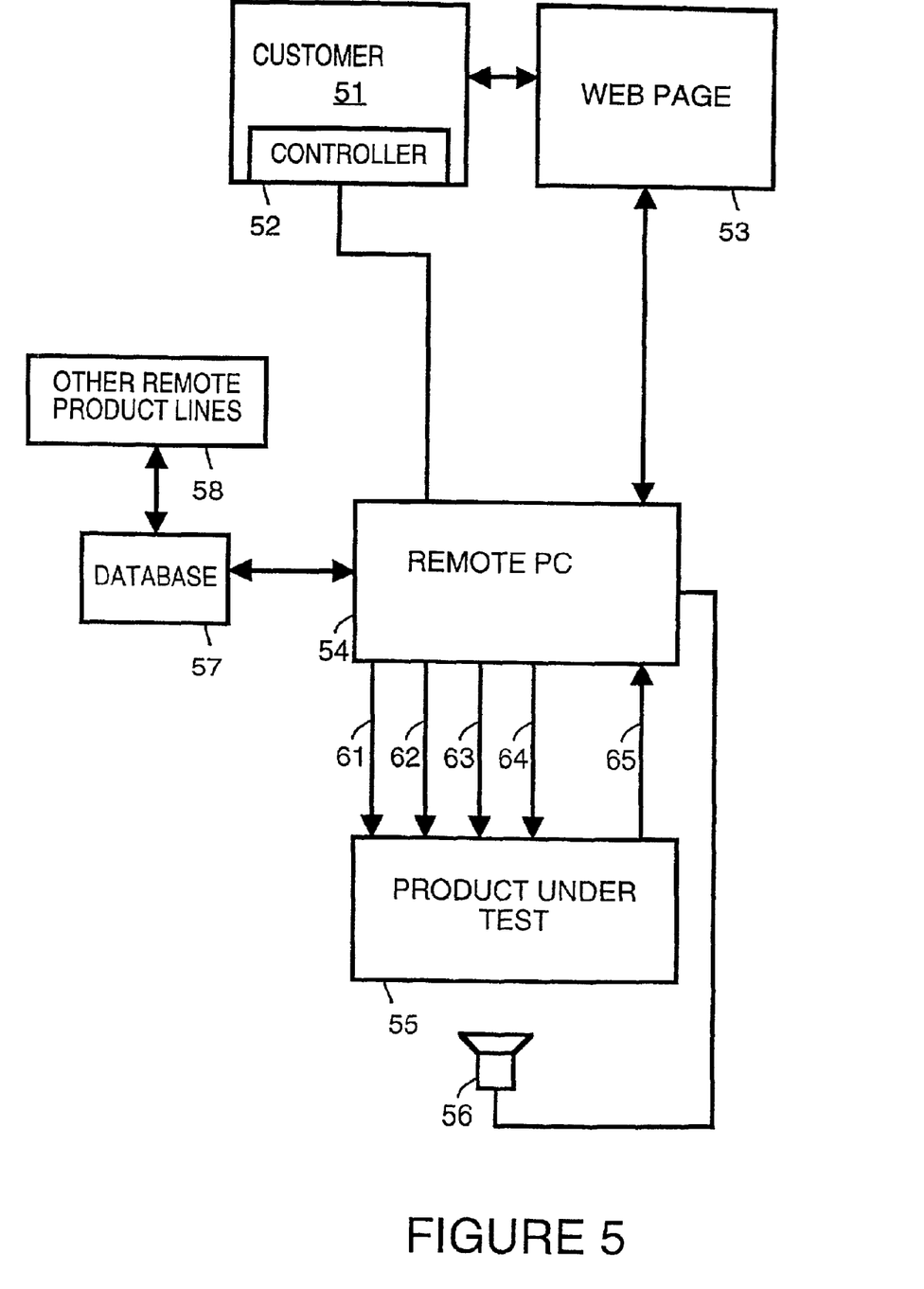
FIG. 5 is a simplified block diagram that shows data flow between a customer 51 and a product under test 55 in an alternative embodiment of the present invention. A web page 53 is used by customer 51 to interact with a remote personal computer (PC) 54 that oversees testing of device under test 55. For example, remote PC 54 includes scripts and utilities to carry out testing. Additionally, remote PC 54 is used to allow the manufacturer to control connection (and disconnection) of customer site 51 to product under test 55 (i.e., the switching function performed by switch 45 shown in FIG. 4) and to introduce special commands (e.g., "hard reset" and "power on/off") to product under test 55.

FIG. 5 is a simplified block diagram that shows data flow between a customer 51 and a product under test 55 in an alternative embodiment of the present invention. A web page 53 is used by customer 51 to interact with a remote personal computer (PC) 54 that oversees testing of device under test 55. For example, remote PC 54 includes scripts and utilities to carry out testing. Additionally, remote PC 54 is used allow the manufacturer to control connection (and disconnection) of customer site 51 to product under test 55 (i.e., the switching function performed by switch 45 shown in FIG. 4) and to introduce special commands (e.g., "hard reset" and "power on/off") to product under test 55.

Remote PC 54 can access additional information from a database 57. For example, when many different customers use product under test 55 for testing, or when one customer wants to test several configurations of product under test 55, an image of a hard drive configuration for each test configuration can be stored or retrieved. Database 57 can also store information used by test systems for other remote product lines 58.

Instead of being connected through the internet, customer 51 can be connected to remote PC 54 and through web page 53 to remote PC 54 by some other network media, for example, by direct connection through a phone line.

Also, while FIG. 5 shows customer 51 being connected to remote PC 54 through a data path implemented by controller 52, alternatively, customer 51 can be connected to remote PC 54 through the datapath between web page 53 and remote PC 54. This allows for the elimination of the separate data path between controller 52 and remote PC 54.

Once remote PC 54 has configured product under test 55 as requested by customer 51, remote PC 54 conducts a test, either using scripts or in real time response to information forwarded from customer 51 through a controller 52 or through web page 53. Controller 52 is optional. In preferred embodiments of the present invention customer 51 can communicate to remote PC 54 exclusively through web page 53.

For example, an arrow 61 represents remote PC 54 presenting simulated keyboard input to product under test 55. An arrow 62 represents remote PC 54 presenting a reset signal to product under test 55. An arrow 63 represents remote PC 54 presenting a power on signal to product under test 55. An arrow 64 represents remote PC 54 presenting simulated mouse input to product under test 55. An arrow 65 represents remote PC 54 receiving display information back from product under test 55. The display information is forwarded back to customer 51 either through web page 53 or through controller 52.

To increase customer comfort level, a web camera 56 can be used to monitor a display of product under test 55. This information can be displayed to the user on web page 53 or forwarded to controller 52 of customer 51.

Figure 6:
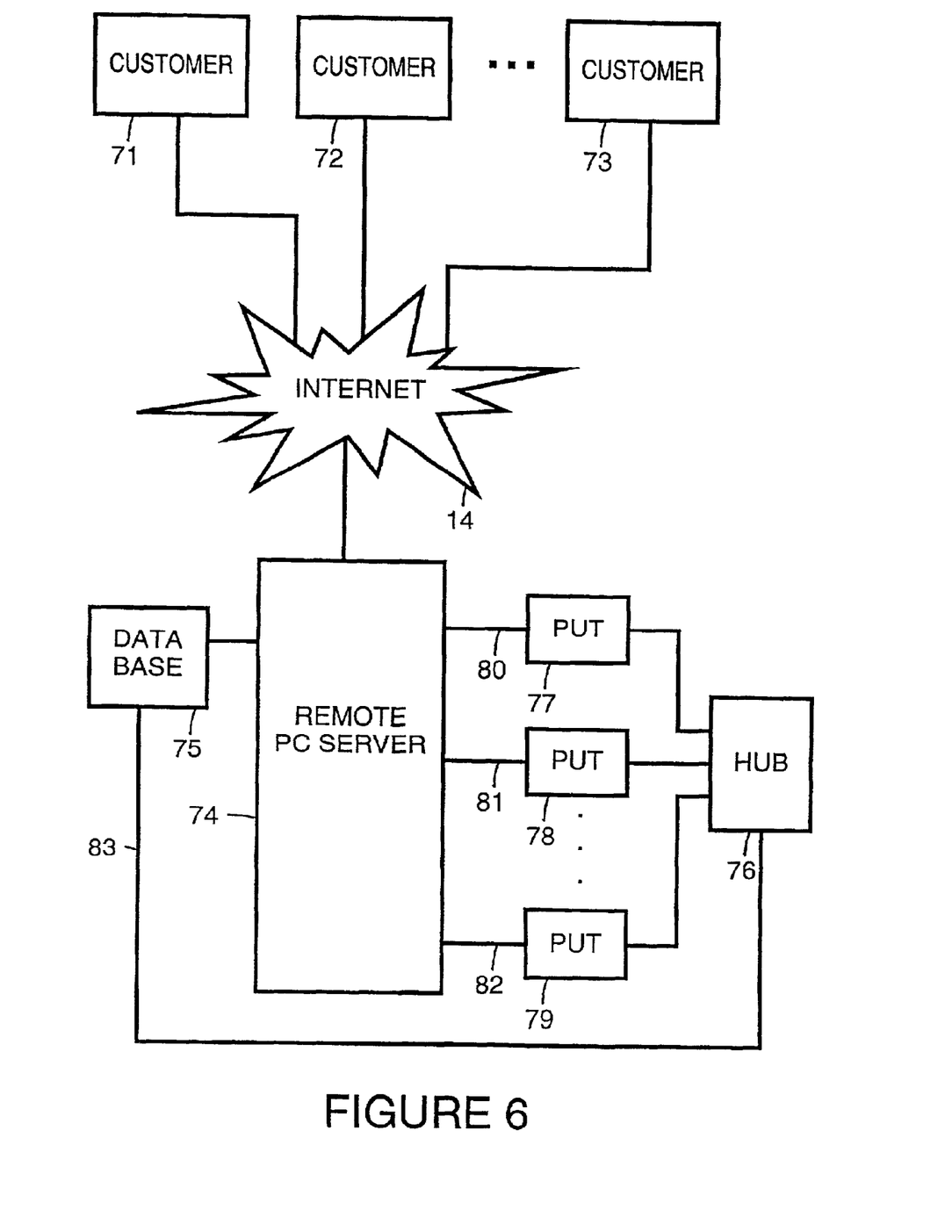
FIG. 6 is a simplified block diagram that shows data flow between multiple customers and multiple products under test. The multiple customers are represented by a customer 71, a customer 72 and a customer 73. The multiple products under test are represented by a product under test 77, a product under test 78 and a product under test 79. Customers 71, 72, and 73 are connected to a remote PC server 74, for example, through network 14. Remote PC server 74 is connected to product under test 77, product under test 78 and product under test 79 as represented respectively by a line 80, a line 81 and a line 82. A database 75 is used, for example, to store an image of a hard drive configuration for each test configuration for each customer. This information can be loaded into individual products under test utilizing a local area network (LAN) 83 connected, for example, to a hub 76. For example, before beginning to perform a test, the customer instructs remote PC server 74 to "clean" the product under test to insure reset to a default state. A hard reset is then performed. This "cleaning" can alternatively be performed at the end of a previous test. Remote PC server 74 then partitions and reformats the hard drive to the requirements of the customer. The customer can then have an image from database 75 loaded into the selected product under test. The image from database 75 can include, for example, the standard manufacturer's image.

FIG. 6 is a simplified block diagram that shows data flow between multiple customers and multiple products under test. The multiple customers are represented by a customer 71, a customer 72 and a customer 73. The multiple products under test are represented by a product under test 77, a product under test 78 and a product under test 79. Customers 71, 72, and 73 are connected to a remote PC server 74, for example, through network 14. A database 75 is used, for example, to store an image of a hard drive configuration for each test configuration for each customer. This information can be loaded into individual products under test utilizing a local area network (LAN) 83 connected, for example, to a hub 76. For example, before beginning to perform a test, the customer instructs remote PC server 74 to "clean" the product under test to insure reset to a default state. A hard reset is then performed. This "cleaning" can alternatively be performed at the end of a previous test. Remote PC server 74 then partitions and reformats the hard drive to the requirements of the customer. The customer can then have an image from database 75 loaded into the selected product under test. The image from database 75 can include, for example, the standard manufacturer's image.

Figure 7:
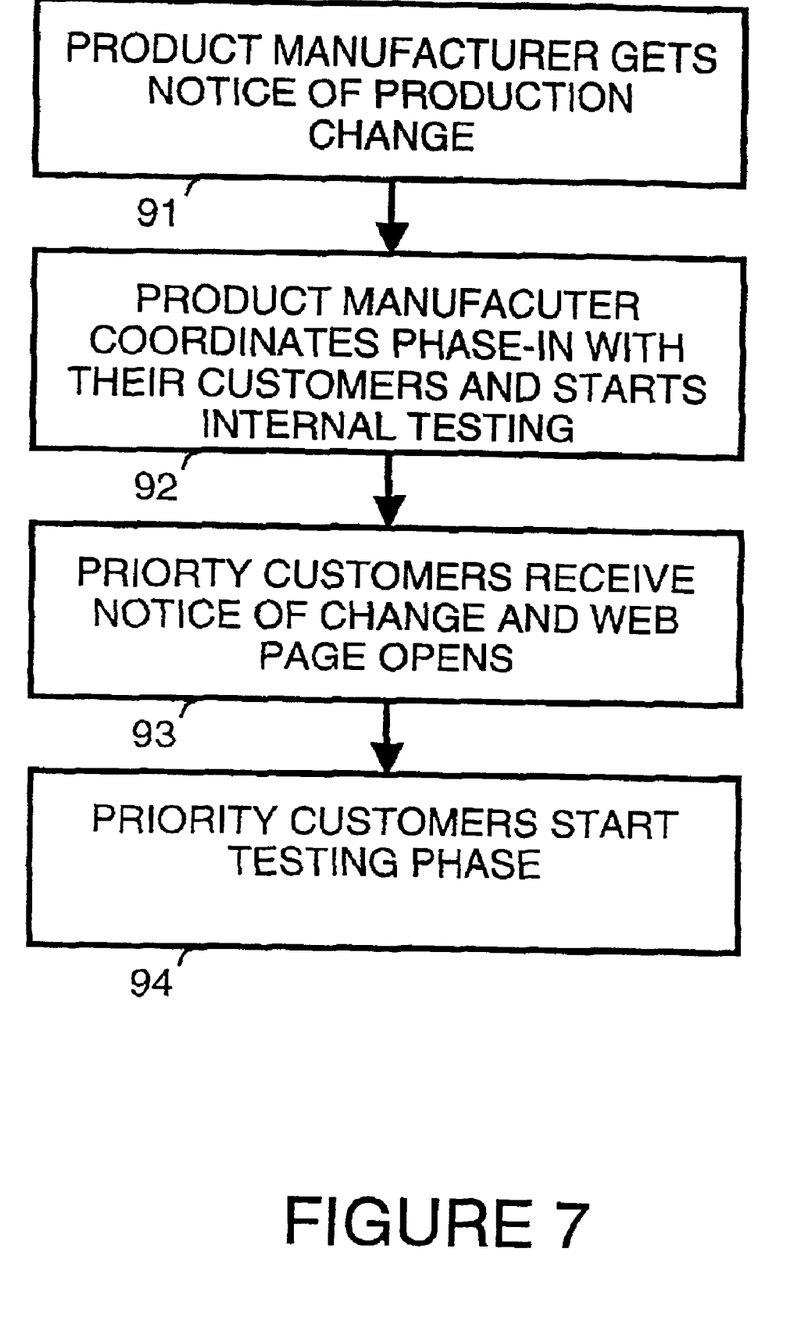
FIG. 7 is a simplified flow chart that illustrates an example process in which the present invention is used for testing a product in accordance with a preferred embodiment of the present invention.

FIG. 7 is a simplified flow chart that illustrates an example process in which the present invention is used for testing a product in accordance with a preferred embodiment of the present invention. In a step 91, a product manufacturer gets notified of a pending production change. The production change could result, for example, from a component supplier or module supplier. The production change could also result from a manufacturing change such as a new layout on a motherboard or adaptation of the product to a new platform.

In a step 92, the product manufacturer coordinates phase-in with their customers and starts internal testing. The change is scheduled with all entities. The product manufacturer interprets the needs and requirements to verify the need for change. The product manufacturer establishes the schedule and coordinates with all resources. The product manufacturer initiates change notification to customers and sales forces. This is to give early warning to customers and sales forces. The notification describes the impact to existing programs and points customers to a pending update web page and the date the web page is to be active and ready for customer testing. The internal testing is then started. The product manufacturer executes mock samples with the proposed production changes tied to a "closed" web page—open only to internal testing. The mock samples then are available to be accessed from the web pages for testing, as described above. Any bug fixes are repaired and updates or repairs are returned to the original component or module supplier.

Once the product is satisfactorily debugged, in a step 93, priority customers receive a notice of the change and the web page is opened for use by customers. In a step 94, priority customers start the testing phase. The tests of products under test remotely via access by the web pages is performed as described above.

The foregoing discussion discloses and describes merely exemplary methods and embodiments of the present invention. As will be understood by those familiar with the art, the invention may be embodied in other specific forms without departing from the spirit or essential characteristics thereof. Accordingly, the disclosure of the present invention is intended to be illustrative, but not limiting, of the scope of the invention, which is set forth in the following claims.

We claim:

1. A system for providing remote testing of a product under test comprising:
   a network accessible site to provide from a remote user connected to a network accessible site, input for the product under test;
   a processing system to receive the input for the product under test from the network accessible site and presenting the input to the product under test as if the input came from an input device directly connected to the product under test; and,
   a test controller to directly introduce to the product under test hardware commands that are not covered in software control.

2. A system as in claim 1 wherein the processing system is a software process running on the product under test.

3. A system as in claim 1 wherein the processing system is capable of simultaneously interacting with multiple additional products under test and receiving input from additional remote users.

4. A system as in claim 1 wherein display information from the product under test is obtained using a web camera.

5. A system as in claim 1 wherein the input is in the form of a script.

6. A system as in claim 1 wherein the processing system includes a database in which is stored images of hard disk configurations.

7. A system as in claim 1 additionally comprising a monitor signal processor that intercepts display information from the product under test via a monitor port on the product under test.

8. A system as in claim 1 wherein the network accessible site obtains a test device configuration from the remote user, the test device configuration being used to configure the product under test.

9. A system as in claim 1 wherein the network accessible site obtains a test device configuration from the remote user, the test device configuration being used to select the product under test.

10. A system as in claim 1 wherein the network accessible site includes a schedule that indicates times the product under test is available to be used for testing purposes.

11. A system as in claim 1 wherein the processing system is a computing system separate from the product under test.

12. A system as in claim 1 wherein the processing system additionally comprises:

a switch function that allows an entity separate from the remote user to disconnect the network accessible site from the processing system.

13. A system for providing remote testing of a plurality of products under test comprising:

a network accessible site for providing from a plurality of remote users connected to the network accessible site, input for the products under test; and, a processing system for receiving first input for one of the plurality of products under test from the network accessible site and presenting the first input to the one of the products under test as if the first input came from an input device directly connected to the one of the products under test, wherein the processing system is configured to present a hardware command directly to the one of the plurality of products under test;

wherein the processing system includes a database in which is stored images of hard disk configurations.

14. A system as in claim 13 wherein the network accessible site includes a schedule that indicates times each product under test is available to be used for testing purposes.

15. A system as in claim 13 wherein the processing system is a computing system separate from the products under test.

16. A system for providing remote testing of a plurality of products under test comprising:

a network accessible site for providing from a plurality of remote users connected to the network accessible site, input for the products under test; and, a processing system for receiving first input for one of the plurality of products under test from the network accessible site and presenting the first input to the one of the products under test as if the first input came from an input device directly connected to the one of the products under test, wherein the processing system is configured to present a hardware command directly to the one of the plurality of products under test;

wherein the network accessible site obtains a test device configuration from a remote user, the test device configuration being used to configure the one of the products under test.

17. A system as in claim 16 wherein the network accessible site includes a schedule that indicates times each product under test is available to be used for testing purposes.

18. A system as in claim 16 wherein the processing system is a computing system separate from the products under test.

* * * * *